(12) United States Patent
Plusquellic et al.

(10) Patent No.: US 10,216,965 B2
(45) Date of Patent: Feb. 26, 2019

(54) SYSTEMS AND METHODS FOR GENERATING PHYSICALLY UNCLONABLE FUNCTIONS FROM NON-VOLATILE MEMORY CELLS

(71) Applicants: STC.UNM, Albuquerque, NM (US); Case Western Reserve University, Cleveland, OH (US)

(72) Inventors: James Plusquellic, Albuquerque, NM (US); Swarup Bhunia, Beachwood, OH (US)

(73) Assignee: STC.UNM, Albuquerque, NM (US)

( * ) Notice: Subject to any disclaimer, the term of this patent is extended or adjusted under 35 U.S.C. 154(b) by 30 days.

(21) Appl. No.: 15/109,747

(22) PCT Filed: Dec. 23, 2014

(86) PCT No.: PCT/US2014/072205
§ 371 (c)(1),
(2) Date: Jul. 5, 2016

(87) PCT Pub. No.: WO2015/105687
PCT Pub. Date: Jul. 16, 2015

(65) Prior Publication Data
US 2016/0328578 A1 Nov. 10, 2016

Related U.S. Application Data
(60) Provisional application No. 61/924,863, filed on Jan. 8, 2014.

(51) Int. Cl.
*G06F 21/75* (2013.01)
*G11C 23/00* (2006.01)
(Continued)

(52) U.S. Cl.
CPC .............. *G06F 21/75* (2013.01); *G06F 7/588* (2013.01); *G06F 21/604* (2013.01); *G09C 1/00* (2013.01);
(Continued)

(58) Field of Classification Search
None
See application file for complete search history.

(56) References Cited

U.S. PATENT DOCUMENTS

2001/0003507 A1* 6/2001 Maruyama ............. G11C 16/28
365/185.2
2006/0271793 A1* 11/2006 Devadas ................. G06F 21/31
713/189
(Continued)

FOREIGN PATENT DOCUMENTS

WO 10105993 A2 9/2010
WO WO-2010105993 A2 * 9/2010 ............. B82Y 10/00
(Continued)

OTHER PUBLICATIONS

P. Koeberl, et al., "Memristor PDFs: A New Generation of Memory-based Physically Unclonable Functions", DATE, 2013 pp. 428-431, Mar. 2013.
(Continued)

*Primary Examiner* — William J. Goodchild
(74) *Attorney, Agent, or Firm* — Valauskas Corder LLC

(57) ABSTRACT

This disclosure describes techniques for generating physically unclonable functions (PUF) from non-volatile memory cells. The PUFs leverage resistance variations in non-volatile memory cells. Resistance variations in array of non-volatile memory cells may be produce a bitstring during an enrollment process. The bitstring may be stored in the non-volatile memory array. Regeneration may include retrieving the bitstring from the non-volatile memory array.

20 Claims, 14 Drawing Sheets

(51) Int. Cl.
*G06F 7/58* (2006.01)
*H04L 9/08* (2006.01)
*G09C 1/00* (2006.01)
*G06F 21/60* (2013.01)
*G11C 13/00* (2006.01)
*G11C 16/10* (2006.01)
*G11C 16/26* (2006.01)

(52) U.S. Cl.
CPC ........ *G11C 13/004* (2013.01); *G11C 13/0069* (2013.01); *G11C 16/10* (2013.01); *G11C 16/26* (2013.01); *G11C 23/00* (2013.01); *H04L 9/0866* (2013.01); *H04L 2209/12* (2013.01)

(56) References Cited

U.S. PATENT DOCUMENTS

2012/0319724 A1* 12/2012 Plusquellic ........... H04L 9/0861
326/8
2013/0003438 A1* 1/2013 Merkel .................... G11C 7/04
365/148

FOREIGN PATENT DOCUMENTS

| WO | 13028553 A1 | 2/2013 | |
|----|----|----|----|
| WO | WO-2013028553 A1 * | 2/2013 | ............. H03M 1/12 |
| WO | 13173729 A1 | 11/2013 | |
| WO | WO-2013173729 A1 * | 11/2013 | ............. G11C 16/22 |

OTHER PUBLICATIONS

G. S. Rose, et al., "Hardware Security Strategies Exploiting Nanoelectronic Circuits", ASP-DAC, 2013, pp. 368-372, Jan. 2013.
G. S. Rose, et al., "Foundations of Memristor Based PDF Architectures," NANOARCH, Jul. 2013.
G. S. Rose, et al., "A Write-Time Based Memristive PDF for Hardware Security Applications", ICCAD, 2013, pp. 830-833, Nov. 2013.
Kavehei, et al., "mrPDF: A Memristive Device based Physical Unclonable Function", CoRR, 2013.
Ho, et al., "Dynamical Properties and Design Analysis for Non-volatile Memristor Memories", Trans. CAS, 58-I(4):724-736, 2011.
Kim, et al., "A Functional Hybrid Memristor Crossbararray/CMOS System for Data Storage and Neuromorphic Applications," Nano Letters, vol. 12, No. 1, pp. 389-395, 2011.
V. Ranganathan, et al., "Nanomechanical Non-Volatile Memory for Computing at Extreme", NANOARCH, 2013, pp. 45-45, Jul. 2013.
Chakraborty et al., "A Transmission Gate Physical Unclonable Function and On-Chip Voltageto-Digital Conversion Technique", Design Automation Conference, pp. 1-10, 2013.
Helinski et al., "A Physical Unclonable Function Defined Using Power Distribution System Equivalent Resistance Variations", Design Automation Conference, pp. 676-681, 2009.
Chakraborty et al., "Bit String Analysis of Physical Unclonable Functions based on Resistance Variations in Metals and Transistors", Symposium on Hardware-Oriented Security and Trust, pp. 13-20, 2012.
Ju et al., "Stability Analysis of a Physical Unclonable Function based on Metal Resistance Variations", Symposium on Hardware-Oriented Security and Trust, pp. 143-150, 2013.

* cited by examiner

SYSTEMS AND METHODS FOR GENERATING PHYSICALLY UNCLONABLE FUNCTIONS FROM NON-VOLATILE MEMORY CELLS

This application claims the benefit of U.S. Provisional Application No. 61/924,863, filed on Jan. 8, 2014, which is incorporated by reference in its entirety.

GOVERNMENT SUPPORT

This invention was made with government support under grants CNS-1018748, CNS-1054744, and DUE-1245756 awarded by NSF. The government has certain rights in the invention.

TECHNICAL FIELD

This disclosure relates to systems and methods for generating bitstrings and more particularly, to Physically Unclonable Functions (PUFs).

BACKGROUND

Secret reproducible bitstrings may be used in various security applications including device identification, authentication, metering, remote activation, and encryption. Physically Unclonable Functions (PUFs) are emerging as an alternative to programming embedded secret keys in read only memories (ROM) and non-volatile memories in integrated circuits (ICs). Physically Unclonable Functions extract entropy from variations in the physical and electrical properties of ICs as a means of generating secret bitstrings. That is, Physically Unclonable Functions may be used to generate unique and random bitstrings for each IC within a population of ICs. Physically Unclonable Functions may incorporate an on-chip infrastructure for measuring and digitizing the corresponding variations.

Some security applications, such as encryption, require precise regeneration of a secret bitstring, possibly under different environmental conditions. This requirement presents challenges for current PUFs, because the entropy source leveraged by a typical PUF may be analog in nature and hence may be significantly impacted by changes in environmental conditions (e.g., temperature and voltage). Moreover, distinguishing subtle differences in the entropy source may be further challenged by measurement noise. Thus, current PUFs may be less than ideal for some security applications.

SUMMARY

In general, this disclosure describes techniques for generating physically unclonable functions (PUFs). In particular, this disclosure describes techniques for producing PUFs from non-volatile memory cells. Specifically, PUFs that leverage the variations of non-volatile memory cells are described. This disclosure describes using non-volatile memory technologies, including, for example, flash, memristors, and Nanoelectromechanical systems (NEMS) devices as a physically unclonable function. Further, the techniques described herein may be applied to existing non-volatile memory technologies (e.g. EEPROM) and emerging non-volatile memory technologies, such as, for example, ReRAM and Spintronic. The non-volatile properties of non-volatile memory devices in combination with within-die resistance variations may make it possible to address major drawbacks of existing PUF technologies. For example, as described herein, a PUF generated from non-volatile memory may be able to regenerate exact copies of a secret bitstring across temperature and voltage environmental variations without the need for any type of publicly stored helper data. In one example, the characteristic that the bi-model resistance profiles of memristor and NEMS devices are widely separated is exploited and therefore, the membership of a specific device in either profile can be determined reliably. In one example, all elements in the array are programmed into a low resistance state and a resistance profile for the elements is constructed. This is followed by an analysis that selects and reprograms elements from the upper half of the profile into a high resistance state. Once programmed, a memory's read-out mechanism can be used to construct a bitstring from the values stored in the memory. The variability in the programmed resistances of non-volatile memory cells may make it possible to construct a PUF with up to an exponential amount, i.e., $2^n$, of stable entropy.

The details of one or more examples are set forth in the accompanying drawings and the description below. Other features, objects, and advantages will be apparent from the description and drawings, and from the claims.

DETAILED DESCRIPTION

Figure 1:
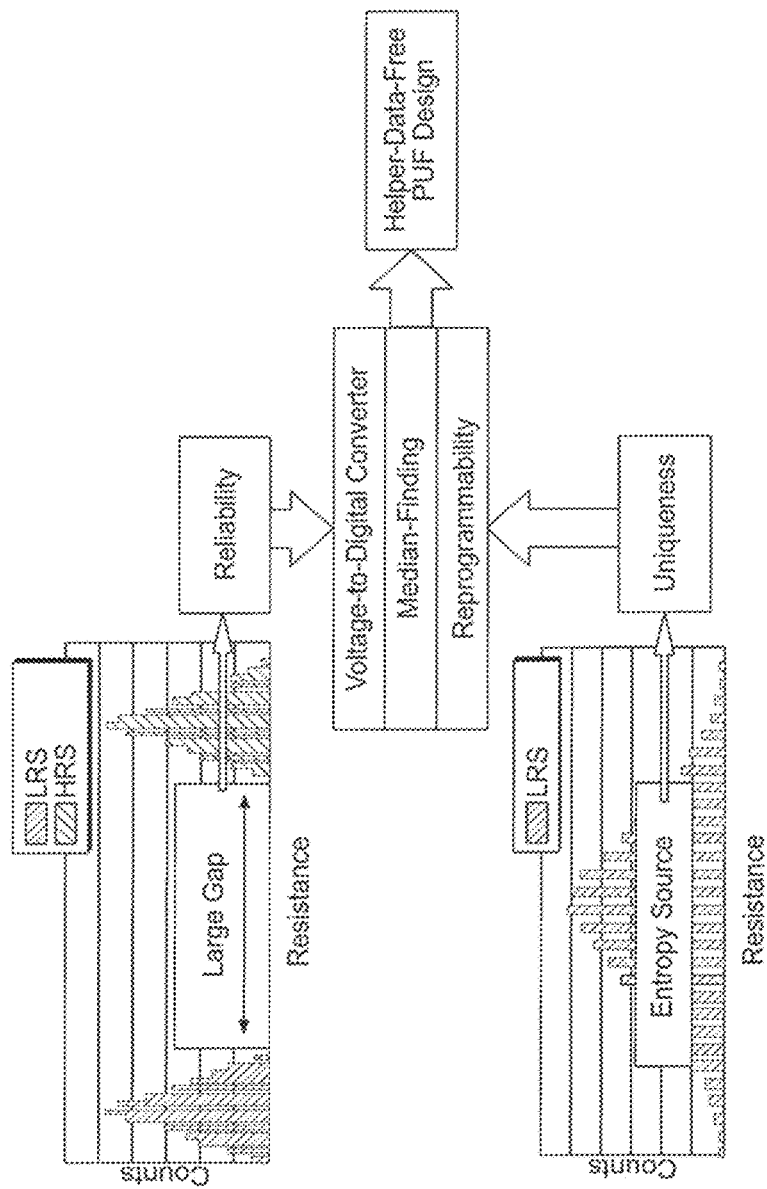
FIG. 1 is a conceptual diagram illustrating a how a Physically Unclonable Function may be generated from a non-volatile memory array according to one or more techniques of this disclosure.

Example PUFs may derive random, but reproducible bitstrings, from variations in the printed and implanted features of wires and transistors on an integrated circuit (IC). Each IC within a population may be uniquely characterized by random manufacturing variations, and therefore, the bitstrings generated by a PUF are unique from one chip to the next. For example, a PUF may measure a voltage or resistance difference between a pair of transistors in an IC. Manufacturing variations may cause the difference value to be different for each IC within a population. The difference value may be digitized to produce either a "1" or a "0" bit. An example PUF may generate a random unique bitstring by producing a sequence of "1" and "0" bits derived from transistor pair difference values.

PUFs can serve several important security applications including authentication and cryptography, which in turn can be used for anti-counterfeiting and detecting malicious system alterations in the field. When PUFs are used in an application, enrollment and regeneration processes are typically performed. Enrollment refers to the process of generating a secret bitstring for the first time and regeneration refers to the process of regenerating or reproducing the bitstring, e.g., after power cycling a cell phone. Ideally, the bitstrings produced during enrollment and regeneration are identical, i.e., there are no errors or bit flips. A bit-flip may be defined as "0-to-1" or "1-to-0" change in bitstring when it is regenerated. Bit-flips may be caused by temperate and voltage variations. For example, the resistance of an IC element may vary as the environmental temperature varies. Thus, a bit value based on a resistance value may change as temperature varies.

In one example authentication application, a trusted supplier chooses a set of random challenges, applies them to a PUF and stores the responses, as challenge-response-pairs (CRPs), in a secure database. This process may occur immediately after manufacturing (time 0) and may be referred to as enrollment. Authentication may be performed later in the field to ensure that an adversary has not "changed-out" the IC for a malicious clone. In this example, the trusted party, who has access to the secure database, reapplies a set of the stored challenges to the IC and checks the consistency of the responses to those in the database. In another example application, PUFs can also be used to produce secret keys for encryption and digital signatures. In this case, a seed parameter is typically supplied as input and the PUF produces a secret bitstring of the length required by the encryption algorithm (enrollment). In many cases, the key needs to be reproduced after the IC is power-cycled (regeneration). It should be noted that unlike authentication applications, which may tolerate errors in the response bits of the PUF, secret keys must be reproduced in a precise fashion. That is, although some applications can tolerate bit flips, applications such as cryptographic applications cannot tolerate them, i.e., all regenerations must produce the exact same bitstring and exact reproduction must be achieved across varying environmental conditions. Further, bit-flips can also degrade applications that can tolerate errors, such as authentication, by increasing the chance of aliasing across the chip population.

It should be noted that variations in the resistance of transistors of an IC can be small, and therefore when two different transistor resistances from the same chip are compared to generate a bit, small changes in the resistance of either transistor introduced by temperature and/or supply voltage variation can easily effect the result of the comparison, introducing a bit-flip. Further, it should be noted that the random nature of process variations essentially guarantees that there will always be pairings of transistor resistances that will be similar and therefore, all chips have a high probability that a bit-flip will occur.

To deal with the challenge of errors and bit-flips, current PUF implementations typically use some type of helper data that serves either to correct errors or to specify which entropy sources (e.g., transistor pairs) are not stable and should be avoided. Helper data needs to be stored in some type of memory for access during regeneration. Most approaches to dealing with bit-flips make use of error correction to fix them. Typically, error correction information is computed during enrollment and stored as helper data in a nonvolatile memory, either on or off chip. One popular approach to error correction is to extract error correcting information from a secret bitstring when it is generated for the first time, during the enrollment process, and use the extracted information to correct errors which occur during regeneration. A second thresholding-based technique avoids bit-flips by being selective regarding which components of the entropy source can be compared reliably to generate a bit. In general, the helper data requirement makes PUFs less attractive commercially because of data management issues, and the possibility that it can be sabotaged by adversaries. Therefore, a PUF that can guarantee reproducibility of the bitstring (e.g., eliminate bit-flips) without helper data would be a great benefit to the commercialization of PUFs.

This disclosure describes example PUFs that are able to regenerate exact copies of secret bitstrings across environmental temperature and voltage variations without the need for any type of publicly stored helper data. In one example, the source of entropy is the within die variations that occur in the cells of a non-volatile memory array. In one example, the reliable storage capability of a non-volatile memory array is leveraged to eliminate the regeneration process and the possibility of bit flip errors. The entropy leveraged in one example is the manufacturing variations that occur in the transconductance (or resistive) characteristics of the non-volatile memory cells. An example enrollment process measures and digitizes these variations and then "programs" the non-volatile cells with the random bitstring that is produced. The full reliability of the non-volatile memory may be used to preserve the bitstring across power cycles and under varying temperature and voltage conditions, which allows regeneration processes to extract it without suffering bit-flip errors.

In one example, the source of entropy that is leveraged during enrollment is variations in the resistance characteristics of the transistors defining the non-volatile memory. In one example, in order to ensure an unbiased entropy source, the transistors are first programmed into their "low resistance" state (e.g., cells programmed to store logic "0"). In one example, a shorting mechanism in combination with an on-chip voltage-to-digital converter (VDC) is then used to read out the voltages, which are proportional to the resistance of the corresponding transistors. A histogram of the digitized voltages may then be processed to determine which non-volatile memory transistors are to be reprogrammed into their high resistance state (e.g., cells with values in the upper half of the profile are reprogrammed to logic "1"). In one example, special control signals on non-volatile memories are used to "read out" the within die variations of each of the cells to create a Gaussian distribution profile for the entire array. The random nature of within die variations makes the profile, and the corresponding pattern of 0's and 1's, unique for each chip. Further, in one example, the random nature of transistor resistance variations makes the programming pattern of a non-volatile memory unpredictable across chips and, potentially, even within the same chip for repeated enrollment processes. This not only provides a high level of randomness between chips, but also enables large numbers of unique bitstrings to be generated by one chip.

It should be noted that non-volatile memory PUFs, by their very nature, may defeat one of the stated advantages of PUFs, i.e., PUFs eliminate the cost of including non-volatile memory on a chip and the need to store the secret bitstring in digital form. However, a non-volatile memory PUF does preserve the basic premise of a PUF, namely, that the secret is derived from manufacturing variations and is not programmed (or even known) by the manufacturer. Further, the non-volatile nature of non-volatile memories presents new opportunities for PUF system design by enabling programmable and persistent changes in the resistance of transistors that survive power cycles. One benefit of the example techniques described herein is the use of non-volatile memory cells as both a source of entropy and a means of eliminating public helper data. It is recognized that in some cases, storing a secret in a non-volatile memory represents a vulnerability and may disqualify non-volatile memory PUFs described herein for high security applications that need to protect against invasive probing attacks. However, the small footprint and the guarantee of high reliability of the non-volatile memory PUFs make them attractive for other, lower security, small form factor applications.

As described above, the elimination of helper data is a major benefit of a PUF generated from a non-volatile memory array. FIG. 1 is a conceptual diagram illustrating how a PUF may be generated from a non-volatile memory array. The resistance distribution shown along the bottom left in FIG. 1 illustrates the randomness that exists in the resistance of the cells of a non-volatile memory array. In one example, the resistance of the cells of a non-volatile memory array may correspond to a resistance value when cells are programmed in a low resistance state (LRS). This distribution may represent the entropy source for an example non-volatile memory PUF. As described below, analog resistance values may be digitized and the median of a distribution may be determined. The histograms shown in the upper left of FIG. 1 depict the profiles after a selected set of non-volatile memory cells are reprogrammed into the high resistance state (HRS). The large gap between these profiles ensures that subsequent regenerations always make the correct decision regarding the profile to which a given non-volatile memory cell belongs. This is a key distinguishing feature of a non-volatile memory PUF. Conventional PUFs operate on the LRS distribution for regeneration. Unfortunately for conventional PUFs, varying temperature and voltage conditions and measurement noise change the LRS distribution profile, making it extremely difficult to generate the same bitstring without helper data.

Figure 2:
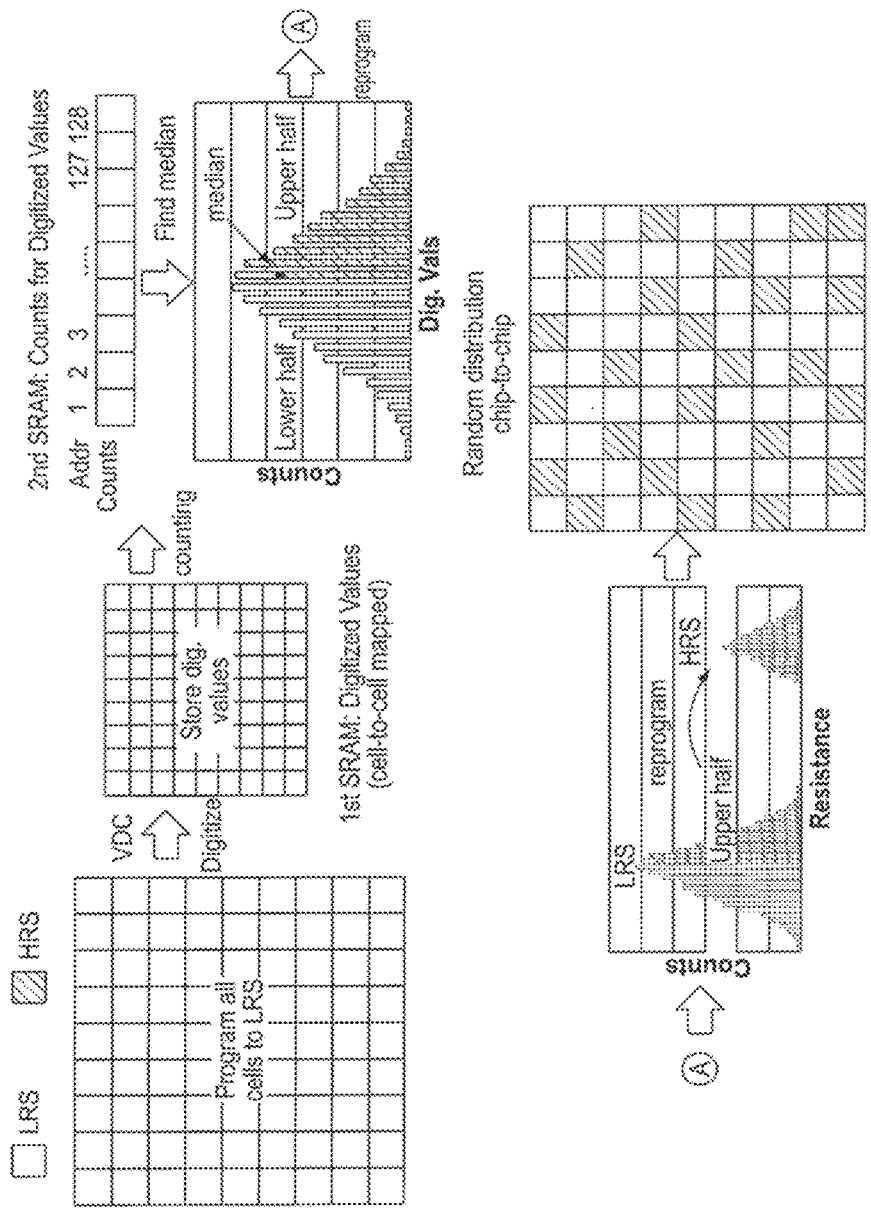
FIG. 2 is a conceptual diagram illustrating an example enrollment process for a Physically Unclonable Function generated from a non-volatile memory array according to one or more techniques of this disclosure.

FIG. 2 is a conceptual diagram illustrating an example enrollment process for a Physically Unclonable Function generated from a non-volatile memory array according to one or more techniques of this disclosure. As illustrated in FIG. 2, the example flow starts with programming all the cells to a low resistance state (LRS). In one example, this may be done by using the "write-operation" of memristors, as described below in detail. In the example illustrated in FIG. 2, a voltage to-digital converter (VDC) is then responsible for digitizing the sensed voltage drop across each cell to a digital value. In the example illustrated in FIG. 2, a digital value may be between 0 and 128. As illustrated in FIG. 2, these digitized values are stored in a memory. In one example, the memory is a SRAM array that is cell-to-cell mapped to the non-volatile memory cell array. A histogram is then created to determine a median. In one example, in order to create a histogram, a state machine is used to count the number of instances for each digitized value (from 0 to 128). This may be achieved by storing the counts of each digital value into memory, for example, a second 129-cell on-chip SRAM, whose addresses represent the counters storing the corresponding digital values. Then a state machine may be utilized to find the median digital value of the profile by adding up the counter values from low to high addresses. The median value may then be recorded and used as a divider that determines which cells are going to be reprogrammed to the high resistance state (i.e., those with larger values than the median). Accordingly, all cells will be randomly split into two equal-numbered groups, LRS and HRS profiles, after the reprogramming procedure. The random variations of LRS determine how the resistance profiles for a specific non-volatile array distributes, with each generating a unique pattern as shown on the far right in FIG. 2. Therefore, the generated bitstring between two different chips will be unique. It should be noted that although in some examples, the median value may be used to create a random bitstring having an equal number of 1's and 0's, in other examples this requirement may be relaxed. That is, in some examples a bitstring having an unequal number of 1's and 0's (e.g., 10-90% of the bits in the bitstring may have a value of 1) may be generated. In one example, the term approximate median value may refer to a value within 10% of the median value. In one example, the term approximate median value may refer to a value within 30% of the median value.

As described above, PUFs using non-volatile memory technologies may include PUFs based on flash, Memristors, and NEMS devices. In each case, a voltage-to-digital converter (VDC) may be used to digitize sensed voltages for each cell in a non-volatile memory array. In one example, the PUF structures that are described herein may require the measurement and digitization of a value proportional to a resistance value or a threshold voltage of flash memory cells. In one example, the PUF structures that are described herein may require the measurement and digitization of a value proportional to a resistance of memristor cells. In one example, the PUF structures that are described herein may require the measurement and digitization of a value proportional to a resistance of NEMS cells. It should be noted that example architectures, which are described in detail below may provide a voltage from a voltage divider network(s) that is proportional to a LRS resistance.

Figure 3:
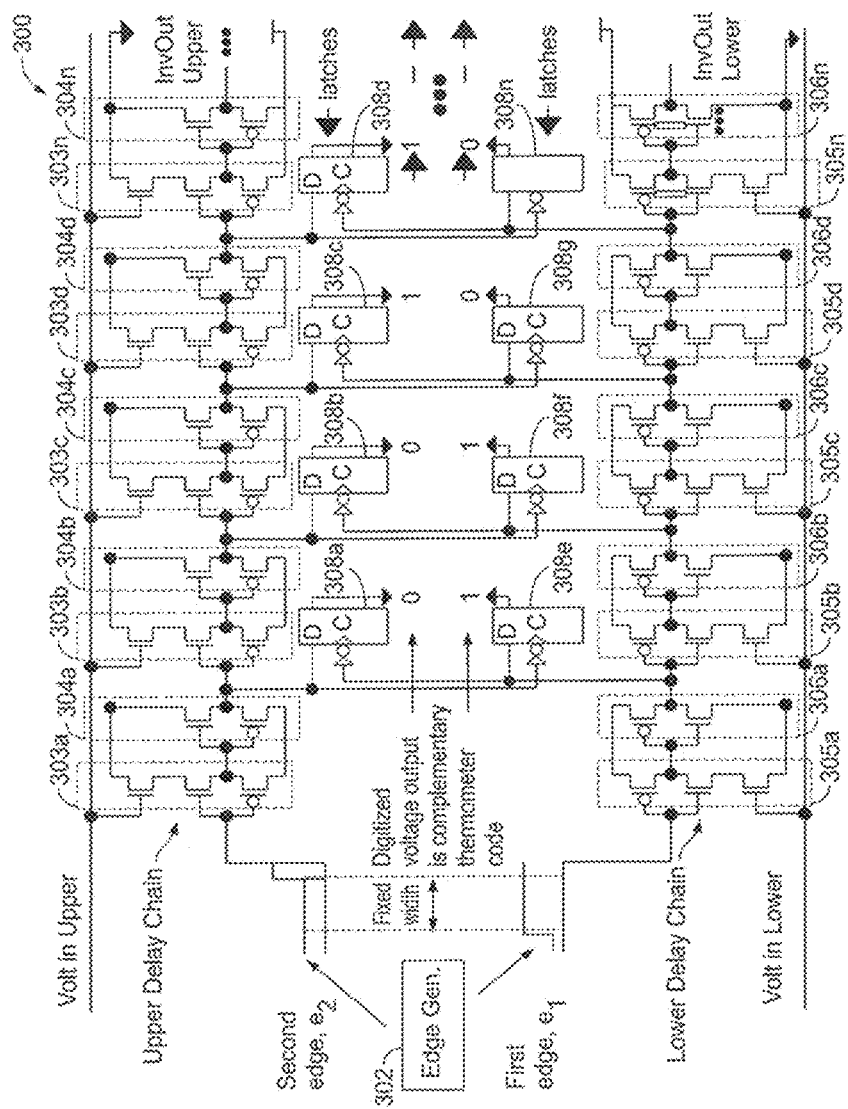
FIG. 3 is a schematic diagram illustrating an example of a voltage-to-digital converter (VDC) that may implement one or more techniques of this disclosure.

As described above, a voltage-to-digital converter (VDC) may be used to digitize sensed voltages for each cell in a non-volatile memory array. FIG. 3 is a schematic diagram illustrating an example of a voltage-to-digital converter (VDC) that may implement one or more techniques of this disclosure. VDC 300 is designed to create a digital thermometer code (TC) that reflects the magnitude of the voltage(s) placed on its inputs. VDC 300 outputs two thermometer codes (TCs) that reflect the magnitude of the sense voltage inputs. A TC is defined as a string of '0'(or '1's) followed by a string of '1's (or '0's). In one example, the number of '1's (or '0's) in the TC reflects the magnitude of the difference between the two applied voltages. In one example, the function of VDC 300 is to create an 8-bit digital value between 0 and 128 that is related to the voltage present on the VoltInLower input. In one example implementation, the voltage applied to VoltInUpper is a supply voltage (e.g., $V_{DD}$) as a way of ensuring that it is always larger than the voltage to be digitized on VoltInLower.

As illustrated in FIG. 3, VDC 300 is composed of two delay chains, where the upper delay chain includes inverters 303a-303n and 304a-304n and the lower delay chain includes inverters 305a-305n and 306a-306n. As illustrated in FIG. 3, VDC 300 includes two inputs labeled VoltInUpper and VoltInLower. These inputs connect to the gates of a set of current-starved inverters that define a delay chain. In one example, only the even numbered inverters in a 256-element delay chain are configured with current-starved NMOS transistors. Therefore, in one example, the VoltInUpper and VoltInLower modulate the delay along the chain using only half, i.e., 128, of the inverters in the delay chain. As illustrated in FIG. 3, the VoltInLower input connects to NFETs, inserted in series with the odd-numbered inverters in the delay chain. VoltInUpper connects in a similar fashion to the upper delay chain. The outputs of the 128 odd numbered inverters connect to a sequence of negative level-sensitive latches 308a-308n, with the upper chain inverter outputs connecting to the D input of the upper row of latches 308a-308n and the C input in the lower set of latches 308a-308n. As illustrated in FIG. 3, a complementary configuration exists for the lower chain.

In one example, a PUF Engine (e.g., a non-volatile memory, not shown in FIG. 3) starts the digitization process by driving a rising edge into edge generator 302. As illustrated in FIG. 3, two wires $e_1$ and $e_2$ are connected to an edge generator 302. In order to obtain a TC from VDC 300, edge generator 302 is used to launch an edge into each of the two delay chains. In one example, edge generator 302 may include a 32-to-1 MUX. Edge generator 302 passes $e_1$ to the corresponding VDC input, but delays $e_2$ by a $\Delta t$ (determined by a 32-to-1 select MUX in one example). The $\Delta t$ between the two edges may be tuned in a calibration process described below to calibrate for a non-volatile memory cell type and/or process, voltage, and/or temperature variations. The two edges then "race" down the two inverter chains at speeds relative to the magnitude of the VoltInUpper and VoltInLower inputs. In one example, voltages less than $V_{DD}$ may introduce additional delay through the inverters that is proportional to the applied voltage as an edge propagates down the inverter chains.

Assuming that the voltage on VoltInUpper is larger than the voltage on VoltInLower, the edge propagating along the top chain moves at a high rate of speed than the lower edge. However, edge generator 302 launches an edge into the lower chain first, allowing it to propagate along some portion of the lower delay chain before an edge is introduced into the upper chain. As long as the lower edge is ahead of the upper edge, '1's are recorded in the upper latches and '0's in the lower latches. When the upper edge passes the lower edge at some point along the delay chain, the pattern reverses. The latches on the outputs of the even inverters in the delay chains record the point at which this happens as a thermometer code (TC). The position of the latch in the sequence where the pattern reverses reflects the difference in the magnitude of the two voltages. Therefore, in one example, two digital 8-bit values, each representing the position of the latch in the sequence of 128 latches where the sequence of '0's (for the upper chain) or sequence of '1's (for the lower chain) changes to '1' and '0's, respectively, can be obtained by analyzing the TCs. In one example PUF, the number of '1's in the 128 latches connected to the lower chain may be referred to as a thermometer code voltages (TCV).

As described above, PUFs using non-volatile memory technologies may include PUFs based on flash, memristors, and NEMS devices. In each case, as described in further detail below, VDC 300 may need to be calibrated for each type of non-volatile memory cell. For example, the wide range of resistance variations that occur in the LRS states of memristors cells produces a wide range of voltages that need to be digitized. Moreover, temperature and environmental variations may also impact the timing behavior of VDC 300. In one example, edge generator 302 is used in a calibration process to ensure that VDC 300 is able to produce useful digital values under these conditions, where "useful" in one example is defined as values above 0 and less than the overflow value of 128. As described below with respect to example types of non-volatile memory cells, calibration tunes the $\Delta t$ between e1 and e2 edges, maximizing the sensitivity of VDC 300 to specific ranges of voltages, and allowing it to accommodate for temperature and voltage variations. Transfer curve characteristics and calibration process are described below in the context of examples.

Figure 4A:
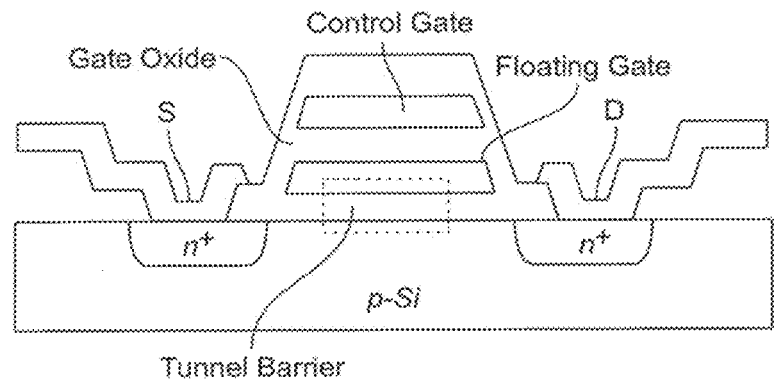
FIG. 4A is a conceptual diagram illustrating an example of a flash memory cell.

As described above, an example PUF may be based on a flash non-volatile memory cell. The physical structure of a flash non-volatile memory cell is illustrated in FIG. 4A. Flash cells are similar to a standard MOS transistor with the exception of the floating gate, which provides the mechanism that allows flash transistors to retain their logic state as a '1' or '0' across power cycles. The charge on the floating gate changes the threshold voltage of the memory cell, which in turns effects the conductivity of the channel when a read-out voltage is applied to the control gate. A programming step is used to negatively charge the floating gate by applying an elevated voltage between the control gate and source (S) of the flash transistor (e.g., typically >5V). Under this condition, some high energy electrons that flow between the source and drain jump across the tunnel barrier onto the floating gate. With the floating gate negatively charged, the read-out voltage applied to the control gate is not large enough to allow the transistor to reach a conduction state and therefore the flash cell remains in high impedance. For those cells that are not programmed, applying the read-out voltage enables conduction, and therefore the flash cell behaves in a similar manner to a non-flash-based MOS transistor.

Figure 4B:
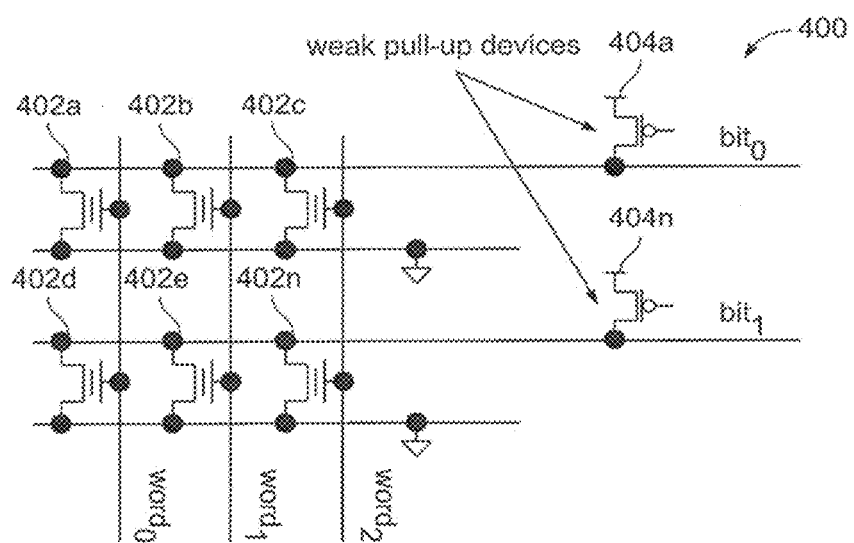
FIG. 4B is a schematic diagram illustrating an example of a flash memory circuit that may implement one or more techniques of this disclosure.

The typical configuration of NOR flash is illustrated in FIG. 4B. As illustrated in FIG. 4B, an array of NOR flash 400 includes flash transistors 402a-402n and pull-up transistors 404a-404n. The memory is accessed by asserting one of the $word_x$ lines and the value of the word is read out on the $bit_x$ lines. For those bit lines whose flash cells are programmed such that there is no charge on the floating gate, the flash cell conducts and pulls the bit line down to a logic '0'. For those programmed with charge, the flash cell remains off and the weak resistive pull-up device maintains the bit line at logic '1'. Reprogramming the flash array involves 'erasing' specific flash cells (or groups of cells) by applying a large negative polarity voltage between the control gate and source terminal, which effectively programs the flash cell(s) to the logic '1' state. It should be noted that in some examples flash devices (e.g., NAND flash devices) may include a read retry feature. That is, in some cases, multi-level cell placements can shift beyond the reference voltage, causing read errors. A read retry feature can shift the reference voltage and then attempt to read a cell. In some examples, a cell may be read until a passing read point is found. As described in detail below, in some examples, a read retry feature may be used to digitize the analog entropy source.

Figure 5:
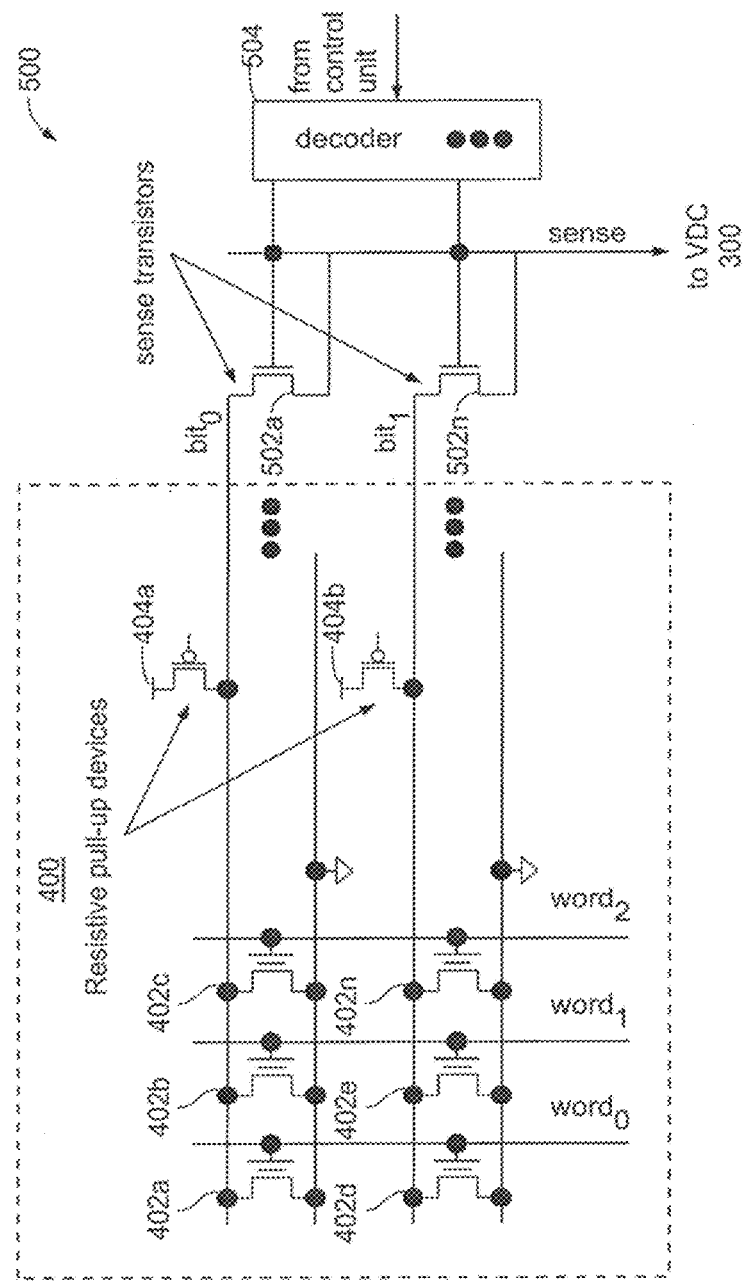
FIG. 5 is a schematic diagram illustrating an example of a Physically Unclonable Function circuit that may implement one or more techniques of this disclosure.

FIG. 5 is a schematic diagram illustrating an example of a Physically Unclonable Function circuit based on a NOR flash device. In the example illustrated in FIG. 5, the use of flash memory as an entropy source of a PUF requires the addition of a sense transistors 502a-502n, voltage-to-digital converter (VDC), for example, VDC 300, and decoder 504 to flash array 400. In the example illustrated in FIG. 5, the sense wire and VDC 300 are used to measure and digitize the voltage drop between the source and the drain into an 8-bit value as each of the flash cells are enabled, one-at-a-time. The voltage drop measurements may be made after erasing the entire flash array 400. As mentioned above, erasing involves removing charge from the floating gate. Therefore, enabling a flash cell creates a voltage divider network between the resistive pull-up device and the enabled flash cell. The voltage produced on the bit wire is transmitted to VDC 300 by enabling a sense transistor for a specific row (e.g., sense 502 for $bit_0$ row). A control unit (not shown), which may be on-chip, controls decoder 504 that is responsible for enabling the appropriate the sense transistor gate.

Figure 6A:
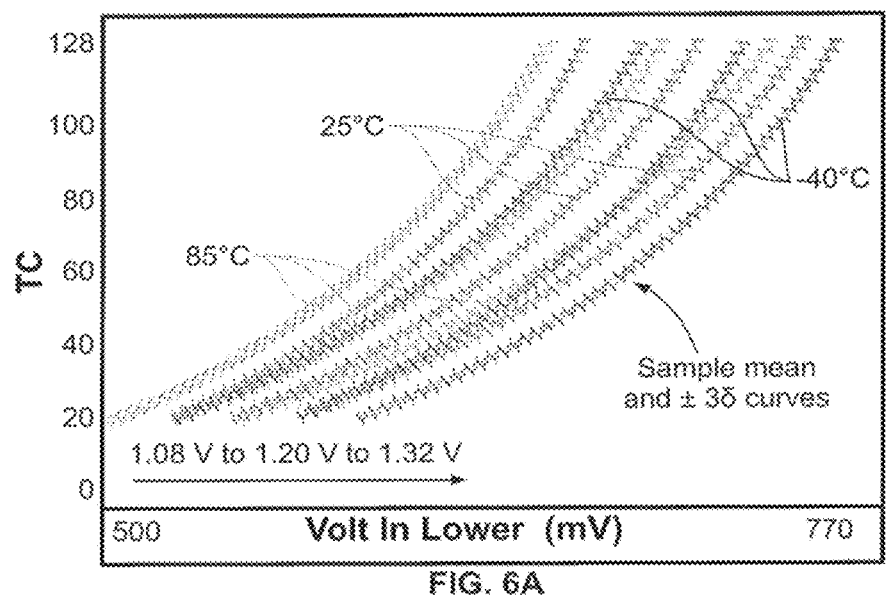
FIG. 6A is a graph illustrating example transfer curves according to techniques of this disclosure.
Figure 6B:
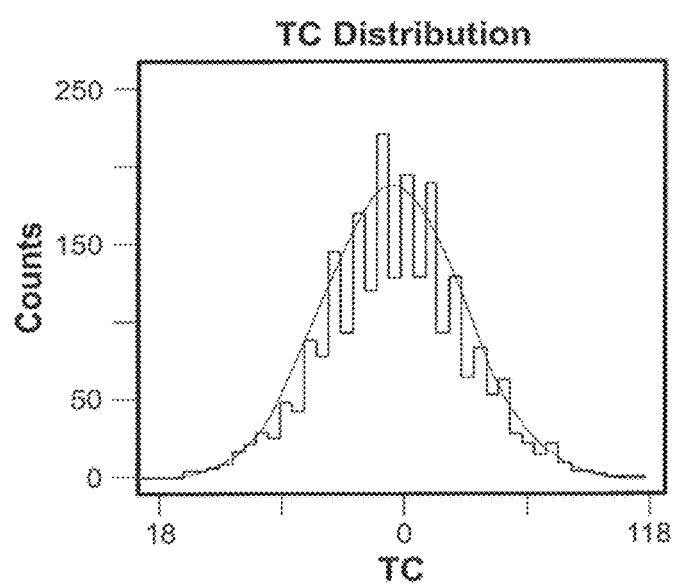
FIG. 6B is a graph illustrating an example thermometer code distribution according to techniques of this disclosure.

A memory, such as, an on-chip SRAM, as described above with respect to FIG. 2, may be used to store each of the 8-bit TC values from the digitization process. In one example, the address of the flash cell may be used as the address to store the 8-bit TC value in the SRAM so as to maintain a one-to-one relationship between the two arrays. The TC values in the SRAM may then be read out by a state machine to create a histogram in a second memory, e.g., an on-chip SRAM. A graphical representation of a histogram using the 8-bit TC values from a transistor array is shown in FIG. 6B. FIG. 6B shows the TC value along the (x-axis) and the number of elements in the array that possess that value on the y-axis. In one example, the median TC value in the histogram is determined by creating a sum of the counts in a left-to-right parsing of the histogram SRAM data and stopping at the TC value (bin) where the sum becomes greater than or equal to one half the number of elements in the flash array. The digitized voltages in the first SRAM are then re-scanned and those flash cells with TCs greater than the median (or approximate median in some examples) are programmed into the high impedance state, i.e., charge is injected onto the floating gate, while those with voltage less than the median are left unchanged (or vise versa). In one example, flash cells that are equal to the median are processed such that the end result is that half of the elements in the flash array are programmed into the high impedance state ('1's) and the other half is left unchanged ('0's).

This example operation effectively partitions the original all '0' distribution of flash cells into two evenly split '0' and '1' distributions. The generation of a bitstring during enrollment and regeneration can now be implemented by simply reading out the contents of the flash cells, or by comparing pairs of stored values. The large threshold between the two distributions makes it possible for the bit generation algorithm to succeed in reliably making the same decision about whether the floating gate of a flash cell is charged or uncharged, and therefore it is possible to regenerate the same bitstring without the need of any type of helper data.

It should be noted that the original erased voltage distribution profile does not need to be Gaussian, as it is shown in FIG. 6B for this scheme to work since the algorithm uses the median value. Depending on the application, requirements may include (1) the flash cell distributions of '0's and '1's remain non-overlapping across temperature and voltage corners; and (2) the ordering within the erased flash cell distribution profile is random from one chip to another. An advantage of a flash PUF is that it may be able to provide a large amount, up to $2^n$ for an n-element array, of stable entropy. This is true because the resistance of the erased flash cells is probabilistic. In other words, the ordering of flash cells in the histogram is likely to change from one enrollment to the next. As described above, enrollment first erases that the entire flash array. Therefore, flash cells, particularly those close to the median, may be programmed as a '0' during some enrollments and as a '1' during other enrollments. The combination of these features make it possible to construct a PUF from a large and stable entropy source and without the need for public data.

It should be noted that the configuration illustrated in FIG. 5 includes only one sense wire while VDC 300 includes two voltage inputs, VoltInUpper and VoltInLower. One possible connection implementation is to connect the VoltInUpper input of VDC 300 to a fixed voltage, e.g., the voltage associated with a $V_{DD}$ supply rail, and the VoltInLower connection to the 'sense' output of the flash array. Another connection implementation may involve placing the voltages from two separate $bit_x$ wires from the flash array on the VDC inputs. This would require replicating the sense wire structure shown on the right side of FIG. 5 and would require additional processing to ensure the larger of the two voltages is placed on VoltInUpper. A potential issue with PUF 500 involves the magnitude of the voltages on the bits wires. The weak pull-up device associated with the flash array shown in FIG. 5 is typically designed to allow the flash cells to pull the voltage on the $bit_x$ wires close to GND (assuming all flash cells have been erased as described above). This is done to maximize the noise margin for error-free read-out operations. When the flash is configured to operate as a PUF, the drive strength of the pull-up device may need to be increased so that the voltage drops produced on the $bit_x$ wires are approximately midway between the supply voltage and GND. This condition significantly improves the sensitivity of the VDC 300, allowing single-digit mV levels of resolution.

As described above, VDC 300 may require calibration for a non-volatile memory array. In one example, VDC 300 provides transfer curves such as those shown in FIG. 6A for translating voltages produced on the $bit_x$ wires of a flash memory array (which may be transferred to the VoltInLower input) into TCs. In the example illustrated in FIG. 6A, the curves for a chip fabricated in a 90 nm technology, before calibration, are shown for each of 9 temperature/voltage corners. As described above, calibration involves tuning the Δt between the two edges launched by edge generator 302 into the delay chains. The goal of calibration is to determine the largest Δt which prevents overflow in the VDC (a condition in which the top edge never catches up to the bottom edge) while maximizing the sensitivity of the measurement. With respect to PUF 500, this is achieved when the largest voltage produced by the flash array produces a TC less than, but close to, 128. Calibration may be an iterative process in which a controller configures edge generator 302 with the maximum Δt, tests one or more flash cells and reduces the Δt (e.g., using MUXes) every time an overflow condition occurs.

As described above, in some examples, a read retry feature may be used to digitize the analog entropy source of a flash device. In this example, first, elements of the PUF's entropy source are programmed to the low resistance state (LRS) and the read retry feature of a memory device may be used to digitize the threshold voltage of each flash memory cell. The digitization process may produce soft information, i.e., an n-bit digital value between 0 and n−1 which captures the magnitude of the threshold voltage and the variations that occur across individual cells in the array.

As described above, an example PUF may be based on a memristor device. Memristors have become a mainstream research topic because of their advantages as novel memory primitives over conventional memory technologies including static RAMs (SRAMs) and flash memories. For example, memristors have intrinsically higher density, faster access speed and better energy efficiency than conventional memory technologies. Memristors are also classified as non-volatile memory technology, in which special write operations can be used to configure cells into one of two (or more) resistance states. A memristor is an electrical switch that is able to retain internal resistance states according to its history of applied voltage and current. The different resistance states can be sensed to generate logic '0's and '1's. Memristor write and read operations are implemented by applying write or read voltage pulse patterns. Different patterns are used for the reading and writing operations.

Figure 7A:
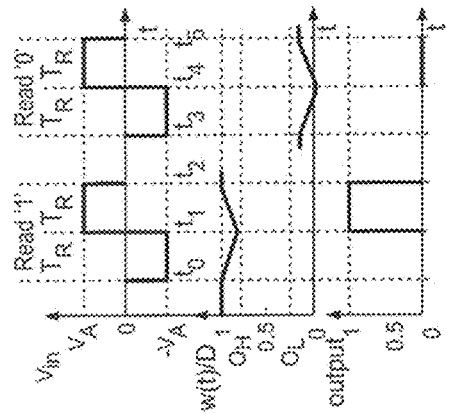
FIGS. 7A-7C are conceptual diagrams illustrating the structure and operation of a memristor.
Figure 7B:
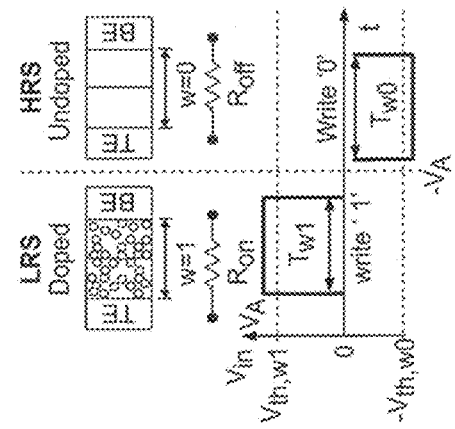
Figure 7C:
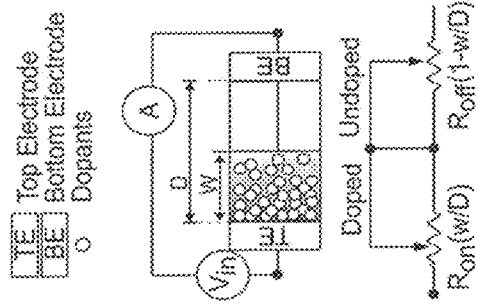

FIGS. 7A-7C illustrate the structure of a memristor cell and the mechanisms used for read and write operations. As shown in FIG. 7A, a memristor cell is comprised of two electrodes (TE and BE) and a metal oxide doping layer sandwiched between them. The length of the doping region, w, will be extended to the maximum length of D when the dopants are fully constructed (doped), and reduced to 0 when dopants are completely destroyed (undoped). The resistances of the completely doped region and undoped region can be represented by $R_{on}$ and $R_{off}$ respectively. Equation (1) gives an expression for the overall resistance as a function of the doping extent w.

$$R(w) = R_{on} * \left(\frac{w}{D}\right) + R_{off} * \left(1 - \frac{w}{D}\right) \quad \text{Equation (1)}$$

The doping behavior can be controlled by applying voltage pulses of the appropriate magnitude and duration as shown in FIG. 7B. The change in the doping characteristic of the memristor cell changes its resistance characteristics. This is depicted in FIG. 7B and labeled as LRS for low resistance state and HRS for a high resistance state, which corresponds to a logic '1' and '0', respectively. To write a logic '1', $V_{in}$ should generate a positive square voltage pattern with magnitude $V_A$ and time duration $T_{W1}$. To ensure a successful write, the magnitude of $V_A$ must be larger than the threshold write voltage of $V_{th,w1}$ and the duration $T_{W1}$ must be longer than $T_{th,w1}$. Similarly, the operation for writing a logic '0' requires a negative write voltage $-V_A$ with duration of at least $T_{th,w0}$. It should be noted that some memristors cannot be configured properly after manufacture until being conditioned with a larger formation voltage $V_f$. The examples described herein may assume memristors used in an enrollment algorithm have been "formed" for normal configurations.

Figure 8:
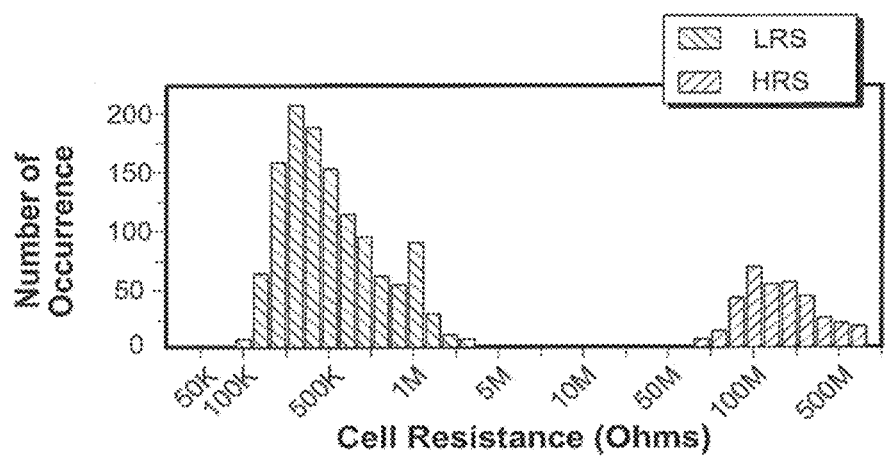
FIG. 8 is a graph illustrating an example histogram of resistances of memristor cells according to techniques of this disclosure.

To perform a read operation, a voltage pulse pattern is required that is composed of a negative pulse followed by a positive pulse with equal magnitude and duration. The negative pulse is used to detect the current internal state but it also perturbs the doping state of the cell. The subsequent positive pulse is designed to re-generate the doping conditions and corresponding resistivity of the original state. This pattern of read pulses is illustrated in FIG. 7C, which also shows when the corresponding output value is available for reading, in particular, the intervals $t_1$-$t_2$ for read '1' and $t_4$-$t_5$ for read '0'. FIG. 8 shows the histogram of the HRS and LRS variations extracted from a 1600 memristor devices in 40×40 nanocrossbar array. The spread in the distributions illustrate that the resistance of a memristor cell after a write operation varies considerably, and is due to process variations and voltage variations over the Δt of the write operation. It should be noted that this characteristic makes it challenging to use memristor cells for a PUF in cases where the resistance variations within either of the two states are used as the source of entropy. This is true because the read operations that take place during regeneration also change the resistance characteristics of the cells, which in turn increases the probability of a bit flip.

The feasibility of building a memristor-based PUF was discussed in P. Koeberl, et al., "Memristor PUFs: A New Generation of Memory-based Physically Unclonable Functions", *DATE*, 2013 pp. 428-431, March, 2013, which is incorporated by reference in its entirety. Koeberl et al. utilized a weak write mechanism which leverages the resulting unpredictable logic states to implement a PUF. The evaluations in Koeberl et al. only focused on the uniqueness metric without consideration for the stability metric of the PUF. The work in G. S. Rose, et al., "Hardware Security Strategies Exploiting Nanoelectronic Circuits", *ASP-DAC*, 2013, pp. 368-372, January 2013, which is incorporated by reference herein, proposed a memristor-based PUF structure that is based on the randomness of the resulting programming state of two cells in series that occurs after a reset operation. G. S. Rose, et al., "Foundations of Memristor Based PUF Architectures," *NANOARCH*, July 2013 and G. S. Rose, et al., "A Write-Time Based Memristive PUF for Hardware Security Applications", *ICCAD*, 2013, pp. 830-833, November 2013 each of which are incorporated by reference herein, proposed a memristor-based PUF that leverages the write time variability of the memristor device. The PUF in Rose et al. is implemented by choosing the actual SET time close to the minimum SET time so that the percentage of the output logic '0' or logic '1' will be each nearly 50%. Another PUF that integrates a memristor device into the conventional RO-PUF structure is proposed in O. Kavehei, et al., "mrPUF: A Memristive Device based Physical Unclonable Function", CoRR, 2013, which is incorporated by reference. In Kavehei et al. variations in high state and low state resistance after a programming operation is used as the entropy source. Kavehei et al. demonstrate that the randomness in the resistance values increases the number of CRPs of conventional RO-PUFs.

In contrast to previous work, the primary goal of the example memristor PUF described herein is to eliminate bit flips and the need for any type of helper data. To realize this goal, in one example, the characteristic that the bimodal resistance profiles of memristor devices are widely separated is exploited and therefore, the membership of a specific device in either profile can be determined reliably. Other advantages of the example memristor PUF described herein is a stimulus circuit and a VDC scheme for obtaining soft information on the resistance characteristics of the nonvolatile memory cells and a median-finding algorithm that is robust to non-Gaussian resistance distribution profiles. In one example, the enrollment process of a memristor PU is carried out as follows: First, elements of the PUF's entropy source are stimulated and digitized using an on-chip measurement structure that is capable of providing 'soft information'. Soft information implies that the magnitude of the analog variations are digitized into multi-bit, e.g., 8-bit, digital values; Second, a distribution is then constructed using these digital values and a median-finding algorithm is used to partition the population into two segments (with an equal number of elements in each segment). memristor cells with digital values in the lower half of the distribution are programmed with a '0' while those in the upper portion are programmed with a '1'.

Figure 9A:
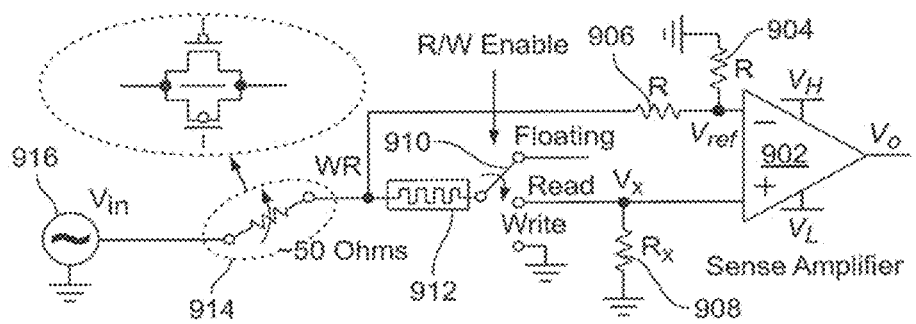
FIG. 9A is a schematic diagram illustrating a memristor memory circuit that may implement one or more techniques of this disclosure.
Figure 9B:
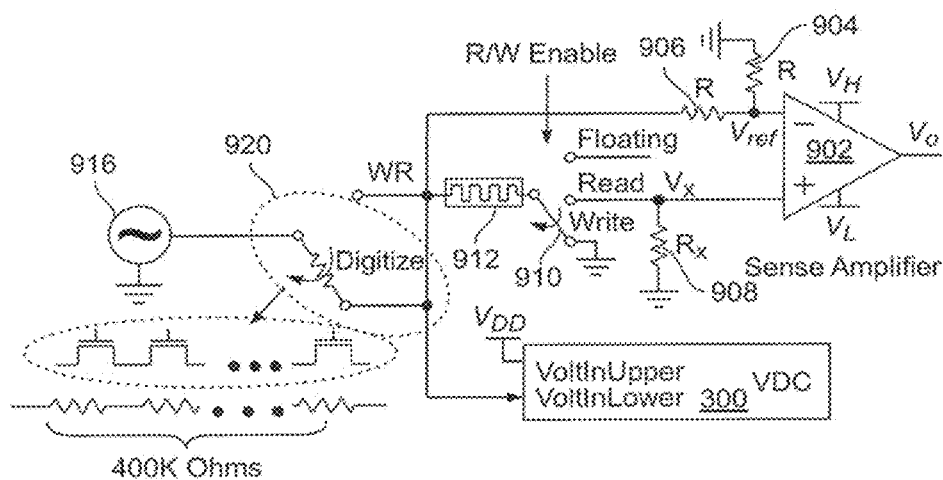
FIG. 9B is a schematic diagram illustrating an example of a Physically Unclonable Function circuit that may implement one or more techniques of this disclosure.

FIG. 9A shows the architecture proposed in Y. Ho, et al., "Dynamical Properties and Design Analysis for Nonvolatile Memristor Memories", Trans. CAS, 58-I(4): 724-736, 2011, which is incorporated by reference, for a memristor-based non-volatile memory, with the exception of switch 914 on the left side of the diagram (which is needed only for the PUF described herein). As illustrated in FIGS. 9A and 9B, the memristor-based non-volatile memory includes sense amplifier 902 and resistors 904 and 906. In one example, the resistance of this switch, implemented as a pass gate with very wide transistors, is very low, e.g., on order of 50 Ohms or less. Switch 914 is closed when the memory is accessed for normal read and write operations. In this case, a pulse generator 916 labeled $V_{in}$ delivers pulses to a selected set (or word) of memristor cells according to the diagrams shown earlier in FIGS. 7A-7C. For normal read operations, the R/W Enable switch 910 is set to the 'Read' position, which creates a voltage divider network between $V_{in}$, across the memristor cell 912 and resistor Rx 908 to ground. The resistance of Rx 908, in one example, is set to a value of approximately $(R_{off}+R_{on})/2$ so that $V_X$ will be larger than $V_{ref}$ (half of $V_{in}$) when the cell is programmed to its LRS and smaller than $V_{ref}$ when programmed to HRS. In this manner, $V_O$ will be $V_H$ (logic '1') when memristor cell 912 is in LRS and $V_L$ (logic '0') when the cell is in HRS. From the distributions shown in FIG. 8, in this example, the value of $R_x$ 908 would be approximately 10 MOhms.

The modifications to the circuit in FIG. 9A shown in FIG. 9B are made in order to allow a memristor memory to be used as a PUF. The large, low resistance switch 914 is disabled and instead a high resistance, approximately 400-500 KOhms, switch 920 is enabled. Switch 920 is also connected in series between pulse generator 916 and the memristor array 912. The value of 400-500 KOHms is the resistance near the midpoint of the distribution of LRS programmed example memristor cells described in FIG. 8. Therefore, when a memristor cell that is programmed in its low resistance state is enabled, the voltage on the voltage divider network, in one example, is a value between 167 mV (for switch 920 equal to 500 KOhms) or 200 mV (for switch 920 equal to 400 KOhms) and 857 mV (for switch 920 equal to 500 KOhms) or 882 mV (for switch 920 equal to 400 KOhms) (for switch 920 equal to 500 KOhms) with $V_{DD}$ at 1.0V. These values are obtained by using the extreme values of the LRS distribution in FIG. 8. For example, 167 mV is obtained from the voltage divider network expression (100 KOhms/600 KOhms) As illustrated in FIG. 9, this voltage is delivered to the VoltInLower input of VDC 300. It should be noted that most memory architectures are byte or word addressable, which means that multiple memristor cells are accessed simultaneously. The arrangement shown in FIG. 9B, on the other hand, assumes that each memristor cell is individually addressable, i.e., the word-size of the PUF implementation is 1 bit. Therefore, in one example, an architecture level change may be needed in addition to the components of FIG. 9A and FIG. 9B in order to convert the memristor array into a PUF.

As described above, the example enrollment process leverages the random resistance variations in the memristor cells as the source of entropy, and then uses the programmability of the memristor cells to eliminate helper data. In one example, the enrollment algorithm that accomplishes these goals is given as follows:

1. The controller for the memory is instructed to program all memristor cells to the low resistance state. This may be accomplished as a normal write 1 operation as described earlier with the large, low resistance pass gate switch enabled.
2. The controller is again instructed to sequence through a set of write operations but this time with the high resistance switch enabled and exactly one memristor cell selected, i.e., the R/W enable signal is set to 'Write' while all other cells in the array are set to 'Floating'.
3. Immediately after the write pulse is asserted, a start signal is issued to the VDC to begin the digitization process.
4. The 8-bit digitized value from the VDC is stored in an on-chip SRAM memory at the address corresponding to the tested memristor cell.
5. Once all cells in the memristor array are digitized, a state machine creates a histogram of the digitized voltages stored in the SRAM. The histogram is created by using the digitized values as an address into a second on-chip SRAM, whose storage locations represent counters recording the number of instances of a particular digitized voltage.
6. A state machine parses the histogram data from low to high address, adding up the counter values. The memory address of the median value, which partitions the array of elements into two equal-sized groups (or unequal-sized groups in some examples), is recorded.
7. The state machine then parses the first SRAM, comparing the stored digitized voltage with the median. The memristor array is again placed in normal write mode and those cells whose value exceeds the median are re-programmed to the HRS.
8. A bitstring is constructed using a sequence of normal read operations, which are designed to preserve the LRS or HRS of the programmed memristor cells. The sequence of read addresses can be generated as a linear sequence or by using a linear-feedback-shift register to generate the sequence pseudo-randomly.

The ordering of the memristor cells from left to right within a histogram is random for each chip, and therefore, the bitstrings will be unique across chips. Also, the large threshold between the two distributions makes it possible for the bit generation algorithm to succeed in reliably making the same decision about whether the memristor cell is in a LRS or HRS, thereby eliminating the need for helper data. It should be noted that resistor divider network reduces the 'write' voltage during the digitize operation, in most cases to a value below the threshold shown in FIG. 7B. Therefore, changes in the actual resistance value are likely to be very small. However, the enrollment process as described is robust to these types of resistance changes so they are of no consequence.

The practicability of the example enrollment process using the measured data from K. Kim, et al., "A Functional Hybrid Memristor Crossbararray/CMOS System for Data Storage and Neuromorphic Applications," Nano Letters, vol.

Figure 10:
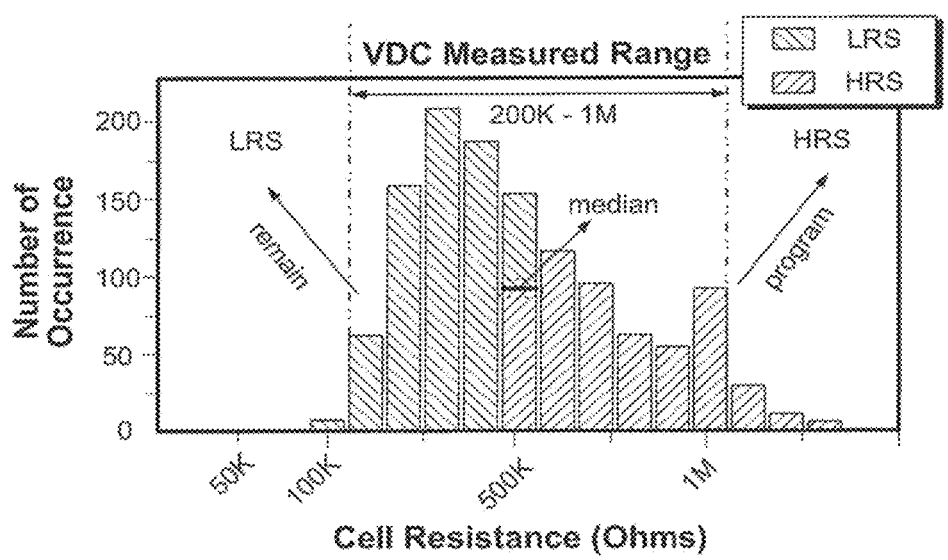
FIG. 10 is a graph illustrating an example histogram of resistances of memristor cells according to techniques of this disclosure.

12, no. 1, pp. 389-395, 2011, which is incorporated by reference herein, may be demonstrated. FIG. 10 shows that resistance variations of the LRS programmed memristor devices ranging from approximately 100 KOhms to 3 MOhms, and the profile does not need to be Gaussian. A robust feature of the example median finding algorithm is that it does not require that a voltage divider network to be built and VDC to digitize this entire range. In fact, only the values in the middle of the distribution, i.e., in the range of 200 KOhms to 1 MOhms, need to produce non-underflow (0) and non-overflow (128) TCVs within the VDC.

Figure 11:
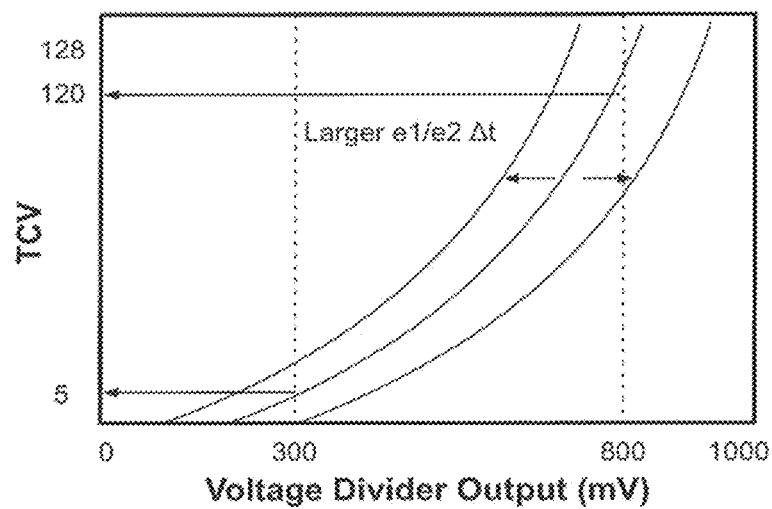
FIG. 11 is a graph illustrating an example transfer curves according to techniques of this disclosure.
Figure 15:
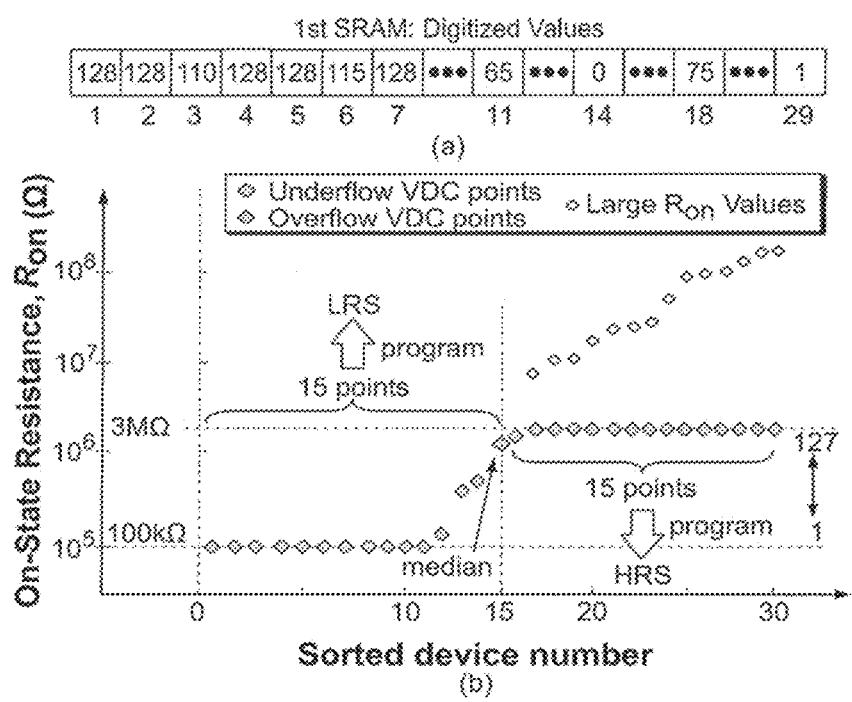
FIGS. 15A-15B is a conceptual diagram illustrating example digitized values according to one example of this disclosure.

The example transfer curves illustrated in FIG. 11 indicate that the VDC operates best for VoltInLower values in the range of 300 mV to 800 mV (for VDD of 1V), where it produces TCVs in the range from 5 to 120. It should be noted that this range can be adjusted using calibration to accommodate process and TV variations, as shown by the dotted curves. As described above, calibration tunes the Δt between e1 and e2, effectively shifting the curves horizontally. Setting the high resistance switch in FIG. 9B to approximately 400 KOhms produces voltages of 333 mV when the memristor cell is 200 KOhms and 714 mV for Memristor cells at 1 MOhms. This range of 333 mV to 714 mV fits within the digitization range of 300 mV to 800 mV, and therefore all cells in this example produce non-underflow and non-overflow digital values. In one example, the digitization process produces only five non overflow values (bear in mind, in an actual implementation, the number of memristor cells will be much larger as well as the number of non-under/overflow values). FIG. 15 show the TCVs using the transfer curve illustrated in FIG. 11 in the SRAM and plots the digitized values, sorted along the x-axis to illustrate the value selected as the median and the reprogramming step carried out on the memristor cells. The median-finding routine succeeds as long as the median value itself is a non-overflow value.

Figure 12:
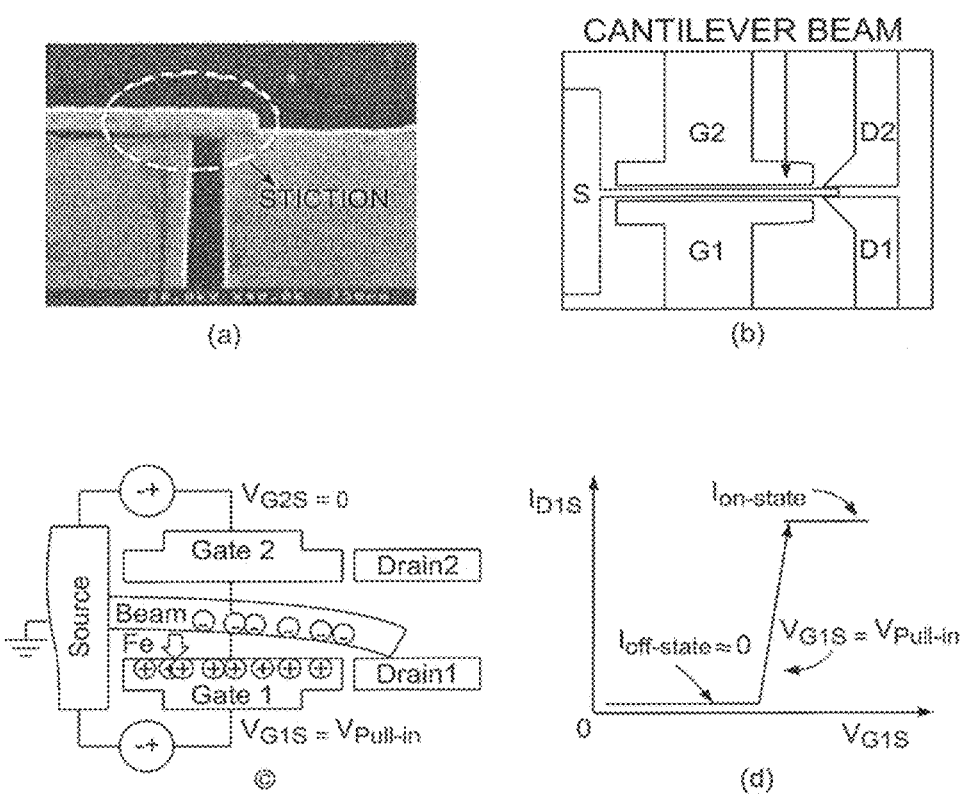
FIGS. 12A-12D are conceptual diagrams illustrating the structure and operation of a Nanoelectromechanical system (NEMS).

As described above, an example PUF may be based on a NEMS device. NEMS have been shown to possess non-volatile memory properties by virtue of a mechanism called "stiction." Under specific programming conditions, stiction creates a semi-permanent, but invertable, connection between the source and drain terminals, resulting in a low resistance state. The semi-permanent connection survives power cycles and therefore can be used to implement a non-volatile memory. FIG. 12 shows the structure and the operational characteristic of an NEMS memory cell proposed in V. Ranganathan, et al., "Nanomechanical Non-Volatile Memory for Computing at Extreme", NANO-ARCH, 2013, pp. 45-45, July 2013, which is incorporated by reference. A NEMS device is composed of two drain terminals (D1 and D2), one source cantilever beam, and two independently controlled gate terminals (G1 and G2) as shown in FIG. 12(a). A one-bit memory cell can be realized using the bi-mechanical-state of the beam, where the different beam positions represent a logic value ("1" when contacting D1 and "0" when D2). A write operation is implemented using the electrostatic actuation of the beam by applying voltage bias between source and gate. A read operation is implemented by passing a current between D1 and the source as a means of determining the beam's position. The operation of storing a logic bit exploits a common failure mechanism called stiction (FIG. 12(b)). As illustrated in FIG. 12(c), when a bias voltage is applied to G1, opposite charges collect between the beam and G1, generating an electrostatic force that pulls the beam bend toward G1. As long as the voltage bias $V_{GIS}$ is larger than the threshold value $V_{pull-in}$, the beam will bend enough to contact D1, forming a "stiction" state. A similar stiction mechanism occurs between D2 and the source (not shown). The stiction causes an invertable contact between the beam and D1, building a bridge for electrons to flow through the two "stiction" terminals. Therefore, the resistance between D1 and source changes to a LRS (on-state). When the stiction occurs between D2 and source, the resistance between D1 and source will change to a very large value, forming a HRS (off-state).

Figure 13:
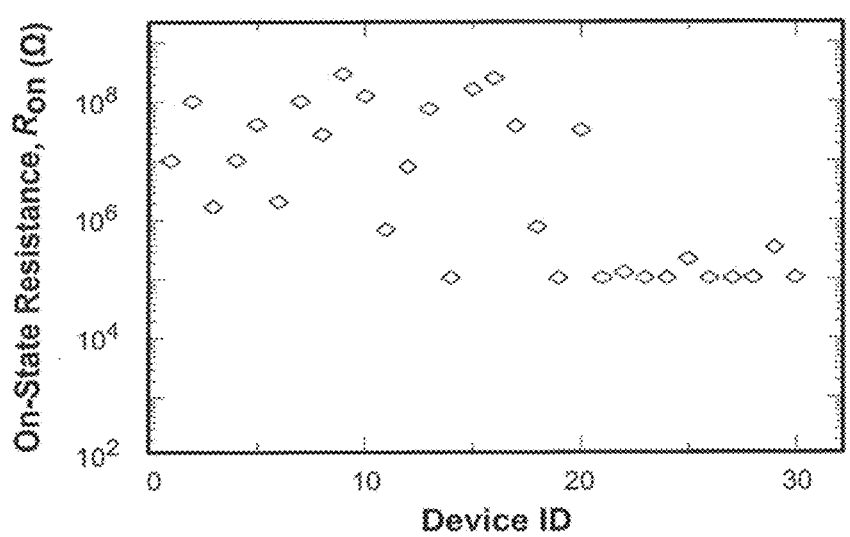
FIG. 13 is a graph illustrating on-state resistance variations of example NEMS devices.
Figure 14:
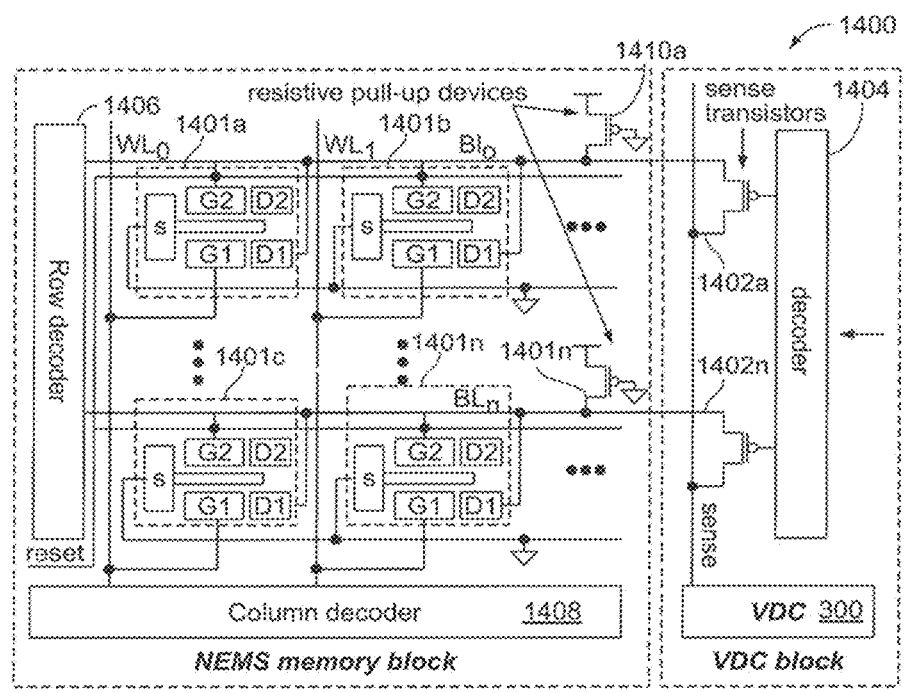
FIG. 14 is a schematic diagram illustrating an example of a Physically Unclonable Function circuit that may implement one or more techniques of this disclosure.

FIG. 13 shows the "on-state" resistance variations of 30 example NEMS devices. Resistance variations occur over the range from 105 to $3*10^8$ Ohms. Similar to the memristor device, described above, the resistance variations that occur in the LRS state can be used as the entropy source. Example modifications that may be made to produce a NEMS-based PUF are shown in FIG. 14. PUF 1400 is composed of a NEMS memory block and a VDC block. Memory block includes row decoder 1406 and column decoder 1408 for addresses cells 1401a-1401n. The D2 terminals of all cells 1401a-1401n connect to a globally routed reset signal, the D1 terminal connects to the bitline and the G1 terminal connects to the wordline, with the S terminal tied to ground. As discussed above, a write is performed by applying a write voltage on either G1 or G2. The resistance between D1 and the source will be very high when the cell is programmed off (using the reset signal) and low when programmed on using a wordline.

Similar to the example enrollment process described above with respect to the example memristor PUF, a mechanism is needed to measure the resistances of the NEMS cells 1401a-1401n. This may be accomplished by adding resistive pull-up devices 1410a-1410n and sense transistors 1402a-1402n, one pair for each row. In one example, the controller (not shown in FIG. 14) resets the array and then selects a specific row using decoder 1404. The words lines, $WL_x$, are then asserted, one at a time, to activate the G1 gate (note, it is not necessary to use stiction in this phase). With the selected NEMS cell in the low resistance state, a voltage divider network is created from $V_{DD}$, through the resistive pullup device and across the activated NEMS cell to ground. The voltage on the bit-line, $BL_x$, is transmitted to VDC 300 and digitized. The rest of the enrollment process is similar to that described with respect to the memristor PUF with one exception. After the histogram is created, those cells to be programmed to the low resistance state are written using the stiction mechanism. This makes the NEMS array non-volatile and allows the regeneration process to reliably re-create the bitstring. It should be noted that more reliable read-out may require the grounded gates of the resistive pull-up devices 1410a-1410n to be re-connected from GND during enrollment to a mid-point voltage during regeneration, e.g., 500 mV, to weaken the pull-ups further and allow the LRS programmed cells to pull the sense wire closer to GND. The enrollment process using the 30 data points from FIG. 13 may be demonstrated. Example resistance variations of LRS programmed NEMS devices range from approximately 100 KOhms to 300 MOhms.

In this manner, the circuits described herein represent example circuits configured to generate physical unclonable functions. Various examples have been described. These and other examples are within the scope of the following claims.

What is claimed is:

1. A method for generating a physically unclonable bit-string, the method comprising:

programming cells in a memory array to a first state;

for each cell in the memory array, measuring by a voltage-to-digital converter a value corresponding to a respective analog entropy source;

digitizing by the voltage-to-digital converter the value for each cell;

determining an approximate median value corresponding to the digitized values;

programming cells in the memory array having a value greater than the approximate median value to a second state; and generating a bitstring by reading the states of cells in the memory array.

2. The method of claim 1, wherein the first state corresponds to a logical zero state and the second state corresponds to a logical one state.

3. The method of claim 1, wherein the first state corresponds to a logical one state and the second state corresponds to a logical zero state.

4. The method of claim 1, wherein the memory array includes a flash memory array.

5. The method of claim 4, wherein determining a value corresponding to a respective analog entropy source includes measuring a voltage corresponding to a threshold voltage of a memory cell.

6. The method of claim 1, wherein the memory array includes a memristor memory array.

7. The method of claim 6, wherein determining a value corresponding to a respective analog entropy source includes measuring a voltage corresponding to a write operation.

8. The method of claim 7, wherein measuring a voltage corresponding to a write operation includes transmitting the voltage to the voltage-to-digital converter.

9. The method of claim 1, wherein the memory array includes a nanoelectromechanical system memory array.

10. The method of claim 9, wherein determining a value corresponding to a respective analog entropy source includes measuring a bitline voltage.

11. A device for generating a physically unclonable bitstring, the device comprising:

an array of memory cells; and circuitry configured to program cells in the memory array to a first state;

measure a voltage-to-digital converter a value corresponding to a respective analog entropy source for each cell in the memory array;

digitize by the voltage-to-digital converter the value for each cell;

determine an approximate median value corresponding to the digitized values; and program cells in the memory array having a value greater than the approximate median value to a second state.

12. The device of claim 11, wherein the first state corresponds to a logical zero state and the second state corresponds to a logical one state.

13. The device of claim 11, wherein the first state corresponds to a logical one state and the second state corresponds to a logical zero state.

14. The device of claim 11, wherein the memory array includes a flash memory array.

15. The device of claim 14, wherein determining a value corresponding to a respective analog entropy source includes measuring a voltage corresponding to a threshold voltage of a memory cell.

16. The device of claim 11, wherein the memory array includes a memristor memory array.

17. The device of claim 16, wherein determining a value corresponding to a respective analog entropy source includes measuring a voltage corresponding to a write operation.

18. The device of claim 11, wherein the voltage-to-digital converter includes one or more delay chains.

19. The device of claim 11, wherein the memory array includes a nanoelectromechanical system memory array.

20. The device of claim 19, wherein determining a value corresponding to a respective analog entropy source includes measuring a bitline voltage.

* * * * *